US006969970B2

(12) United States Patent
Dias et al.

(10) Patent No.: US 6,969,970 B2
(45) Date of Patent: Nov. 29, 2005

(54) METHOD OF CONTROLLING THE CHARGING OF A BATTERY

(75) Inventors: Donald R. Dias, Carrollton, TX (US); Robert D. Lee, Denton, TX (US)

(73) Assignee: Dallas Semiconductor Corporation, Dallas, TX (US)

( * ) Notice: Subject to any disclaimer, the term of this patent is extended or adjusted under 35 U.S.C. 154(b) by 0 days.

(21) Appl. No.: 10/348,584

(22) Filed: Jan. 21, 2003

(65) Prior Publication Data
US 2003/0189417 A1 Oct. 9, 2003

Related U.S. Application Data

(63) Continuation of application No. 09/973,155, filed on Oct. 9, 2001, which is a continuation of application No. 09/454,275, filed on Dec. 3, 1999, now abandoned, which is a continuation of application No. 09/178,675, filed on Oct. 26, 1998, now Pat. No. 6,018,228, which is a continuation of application No. 08/901,068, filed on Jul. 28, 1997, now Pat. No. 5,867,006, which is a continuation of application No. 08/764,285, filed on Dec. 12, 1996, now Pat. No. 5,694,024, which is a continuation of application No. 07/957,571, filed on Oct. 7, 1992, now Pat. No. 5,592,069.

(51) Int. Cl.$^7$ .................. H01M 10/44; H01M 10/46
(52) U.S. Cl. ............................................. 320/106
(58) Field of Search ........................... 320/106, 110, 320/121, 125, 132, 161, DIG. 19, DIG. 21, 124, 138, 147, 150, 155; 429/61

(56) References Cited

U.S. PATENT DOCUMENTS

| 2,225,460 A | 12/1940 | Porth |
| 3,599,071 A | 8/1971 | Lapugyade et al. |
| 3,617,850 A | 11/1971 | Domshy |
| 3,617,851 A | 11/1971 | DuPuy et al. |
| 3,624,481 A | 11/1971 | Macharg |
| 3,667,026 A | 5/1972 | Bogut et al. |
| 3,778,702 A | 12/1973 | Finger |
| 3,816,807 A | 6/1974 | Taylor |
| 3,872,457 A | 3/1975 | Ray et al. |
| 3,890,556 A | 6/1975 | Melling et al. |
| 3,895,284 A | 7/1975 | Schweizer et al. |
| 3,917,990 A | 11/1975 | Sherman, Jr. |
| 3,947,743 A | 3/1976 | Mabuchi et al. |
| 4,006,396 A | 2/1977 | Bogut |
| 4,006,397 A | 2/1977 | Catotti et al. |
| 4,052,656 A | 10/1977 | Lavell et al. |
| 4,061,956 A | 12/1977 | Brown et al. |
| 4,091,320 A | 5/1978 | Foster |
| 4,123,598 A | 10/1978 | Hammel |
| 4,125,802 A | 11/1978 | Godard |
| 4,153,867 A | 5/1979 | Jungfer et al. |
| 4,180,770 A | 12/1979 | Eby |
| 4,207,513 A | 6/1980 | Hess, Jr. |
| 4,209,736 A | 6/1980 | Reidenbach |
| 4,225,815 A | 9/1980 | Lind et al. |
| 4,229,687 A | 10/1980 | Newman |
| 4,236,084 A | 11/1980 | Gingras |
| 4,289,836 A | 9/1981 | Lemelson |
| 4,307,330 A | 12/1981 | Belot |
| 4,308,492 A | 12/1981 | Mori et al. |
| 4,315,364 A | 2/1982 | Leffingwell |
| 4,320,333 A | 3/1982 | Hase |
| 4,329,406 A | 5/1982 | Dahl et al. |
| 4,333,149 A | 6/1982 | Taylor et al. |
| 4,352,067 A | 9/1982 | Ottone |
| 4,370,606 A | 1/1983 | Kakumoto et al. |
| 4,377,787 A | 3/1983 | Kikuoka et al. |
| 4,385,269 A | 5/1983 | Aspinwall et al. |
| 4,387,334 A | 6/1983 | Loper |
| 4,388,582 A | 6/1983 | Saar et al. |
| 4,390,841 A | 6/1983 | Martin et al. |
| 4,392,101 A | 7/1983 | Saar et al. |
| 4,418,310 A | 11/1983 | Bollinger |
| 4,433,277 A | 2/1984 | Carollo et al. |
| 4,433,294 A | 2/1984 | Windebank |
| 4,455,523 A * | 6/1984 | Koenck ............... 320/131 |
| 4,525,055 A | 6/1985 | Yokoo |
| 4,530,034 A | 7/1985 | Kawarada |
| 4,553,081 A | 11/1985 | Koenck |
| 4,554,500 A | 11/1985 | Sokira |
| 4,556,958 A | 12/1985 | Ugon |
| 4,564,798 A | 1/1986 | Young |
| 4,576,880 A | 3/1986 | Verdier et al. |

(Continued)

FOREIGN PATENT DOCUMENTS

| DE | 3528659 A1 | 2/1987 |
| EP | 0074444 | 3/1983 |
| EP | 0 074 444 | 3/1983 |
| EP | 0 124 739 | 11/1984 |
| EP | 0340794 | 11/1989 |
| EP | 0361859 | 4/1990 |
| EP | 0394074 | 10/1990 |
| EP | 0480706 | 4/1992 |
| EP | 0549950 | 7/1993 |
| EP | 0572327 | 12/1993 |
| GB | 1487604 | 10/1977 |
| GB | 2219151 | 11/1989 |
| GB | 2270983 | 3/1994 |
| JP | 4-255433 | 10/1992 |
| WO | WO 91/1167 | 7/1989 |
| WO | WO 90/03682 | 4/1990 |
| WO | WO 91/0860 | 6/1991 |
| WO | WO 92/11680 | 7/1992 |

Primary Examiner—Edward H. Tso
(74) Attorney, Agent, or Firm—Jenkens & Gilchrist

(57) ABSTRACT

A battery charger with charging parameter values derived from communication with a battery pack to be charged. Communication is over a one-wire bus with battery pack transmissions in response to charger inquiries. The battery charger may be in the form an integrated circuit driving a power transistor or other controllable DC supply. A battery pack may contain a program with multiple charging currents and charging interval termination methods such as time, temperature rise, and incremental voltage polarity. A lack of communication may be invoke a default charging program or denial of access to the charger. The charger also communicates over a high-speed three-wire bus with an external computer for analysis of identification information acquired from the battery and for control of the charger.

6 Claims, 6 Drawing Sheets

U.S. PATENT DOCUMENTS

| | | |
|---|---|---|
| 4,583,034 A | 4/1986 | Martin |
| 4,593,409 A | 6/1986 | Miller |
| 4,595,880 A | 6/1986 | Patil |
| 4,598,243 A | 7/1986 | Kawakami |
| 4,616,171 A | 10/1986 | Hernandez et al. |
| 4,628,243 A | 12/1986 | Hodgman et al. |
| 4,633,418 A | 12/1986 | Bishop |
| 4,637,965 A | 1/1987 | Davis |
| 4,638,237 A | 1/1987 | Fernandez |
| 4,639,655 A | 1/1987 | Westhaver et al. |
| 4,658,199 A | 4/1987 | Hoffman |
| 4,659,994 A | 4/1987 | Poljak |
| 4,670,703 A | 6/1987 | Williams |
| 4,677,363 A | 6/1987 | Kopmann |
| 4,709,202 A | 11/1987 | Koenck et al. |
| 4,710,694 A | 12/1987 | Sutphin et al. |
| 4,716,354 A | 12/1987 | Hacker |
| 4,724,528 A | 2/1988 | Eaton |
| 4,725,784 A | 2/1988 | Peled et al. |
| 4,737,420 A | 4/1988 | Ikeda et al. |
| 4,737,702 A | 4/1988 | Koenck |
| 4,743,831 A | 5/1988 | Young |
| 4,745,349 A | 5/1988 | Palanisamy et al. |
| 4,746,852 A * | 5/1988 | Martin ................ 320/106 |
| 4,746,854 A | 5/1988 | Baker et al. |
| 4,755,733 A | 7/1988 | Laliberte |
| 4,775,827 A | 10/1988 | Ijntema et al. |
| 4,803,416 A | 2/1989 | Abiven et al. |
| 4,806,840 A | 2/1989 | Alexander et al. |
| 4,820,965 A | 4/1989 | Siemer |
| 4,823,086 A | 4/1989 | Whitmire et al. |
| 4,829,225 A | 5/1989 | Podrazhansky et al. |
| 4,833,459 A | 5/1989 | Geuer et al. |
| 4,843,299 A | 6/1989 | Hutchings |
| 4,845,419 A | 7/1989 | Hacker |
| 4,849,682 A | 7/1989 | Bauer et al. |
| 4,871,956 A | 10/1989 | Barrella |
| 4,876,513 A | 10/1989 | Brilmyer et al. |
| 4,885,523 A | 12/1989 | Koenck |
| 4,914,393 A | 4/1990 | Yoshido |
| 4,918,368 A | 4/1990 | Baker et al. |
| 4,929,931 A | 5/1990 | McCuen |
| 4,937,528 A | 6/1990 | Palanisamy |
| 4,943,498 A | 7/1990 | Cooper et al. |
| 4,945,217 A | 7/1990 | Bolan |
| 4,947,123 A | 8/1990 | Minezawa |
| 4,948,954 A | 8/1990 | Dias |
| 4,949,046 A | 8/1990 | Seyfang |
| 4,952,862 A | 8/1990 | Biagetti et al. |
| 4,961,043 A | 10/1990 | Koenck |
| 4,965,738 A | 10/1990 | Bauer et al. |
| 4,969,206 A | 11/1990 | Desrochers |
| 4,972,377 A | 11/1990 | Lee |
| 4,982,371 A | 1/1991 | Bolan et al. |
| 4,983,820 A | 1/1991 | Dias |
| 4,995,004 A | 2/1991 | Lee |
| 4,997,731 A | 3/1991 | Machida et al. |
| 4,998,057 A | 3/1991 | Shinohara et al. |
| 5,012,176 A | 4/1991 | LaForge |
| 5,013,992 A | 5/1991 | Eavenson et al. |
| 5,027,294 A | 6/1991 | Fakruddin et al. |
| 5,032,825 A | 7/1991 | Kuznicki |
| 5,043,651 A | 8/1991 | Tamura |
| 5,045,675 A | 9/1991 | Curry |
| 5,047,961 A | 9/1991 | Simonsen |
| 5,049,803 A | 9/1991 | Palanisamy |
| 5,049,804 A | 9/1991 | Hutchings |
| 5,057,383 A | 10/1991 | Sokira |
| 5,057,762 A | 10/1991 | Goedken et al. |
| 5,065,084 A | 11/1991 | Oogita |
| 5,111,128 A | 5/1992 | Branan, Jr. et al. |
| 5,115,182 A | 5/1992 | Ehmke et al. |
| 5,121,047 A | 6/1992 | Goedken et al. |
| 5,122,722 A | 6/1992 | Goedken et al. |
| 5,130,659 A | 7/1992 | Sloan |
| 5,144,218 A | 9/1992 | Bosscha |
| 5,144,248 A | 9/1992 | Alexandres et al. |
| 5,150,031 A | 9/1992 | James et al. |
| 5,151,644 A | 9/1992 | Pearson et al. |
| 5,157,320 A | 10/1992 | Kuriloff |
| 5,164,652 A | 11/1992 | Johnson et al. |
| 5,164,761 A | 11/1992 | Isono et al. |
| 5,166,596 A | 11/1992 | Goedken |
| 5,168,206 A | 12/1992 | Jones |
| 5,180,961 A | 1/1993 | Tsujino |
| 5,183,714 A | 2/1993 | Mitsui et al. |
| 5,185,566 A | 2/1993 | Goedken et al. |
| 5,193,067 A | 3/1993 | Sato et al. |
| 5,196,779 A | 3/1993 | Alexandres et al. |
| 5,198,743 A | 3/1993 | McClure et al. |
| 5,200,686 A | 4/1993 | Lee |
| 5,200,689 A | 4/1993 | Interiano et al. |
| 5,204,611 A | 4/1993 | Nor et al. |
| 5,206,097 A | 4/1993 | Burns et al. |
| 5,208,116 A | 5/1993 | Joh |
| 5,216,371 A | 6/1993 | Nagai |
| 5,227,262 A | 7/1993 | Ozer |
| 5,229,704 A | 7/1993 | Knepper |
| 5,237,257 A | 8/1993 | Johnson et al. |
| 5,248,927 A | 9/1993 | Takei et al. |
| 5,248,929 A | 9/1993 | Burke |
| 5,254,928 A | 10/1993 | Young et al. |
| 5,274,319 A | 12/1993 | Keener et al. |
| 5,274,321 A | 12/1993 | Matsuda |
| 5,278,487 A | 1/1994 | Koenck |
| 5,283,511 A | 2/1994 | Keener et al. |
| 5,284,719 A | 2/1994 | Landau et al. |
| 5,287,286 A | 2/1994 | Ninomiya |
| 5,298,346 A | 3/1994 | Gyenes |
| 5,300,874 A | 4/1994 | Shimamoto et al. |
| 5,315,228 A | 5/1994 | Hess et al. |
| 5,321,627 A | 6/1994 | Reher |
| 5,325,041 A | 6/1994 | Briggs |
| 5,331,268 A | 7/1994 | Patino et al. |
| 5,332,957 A | 7/1994 | Lee |
| 5,349,282 A | 9/1994 | McClure |
| 5,350,993 A | 9/1994 | Toya et al. |
| 5,350,995 A | 9/1994 | Iketani |
| 5,357,203 A | 10/1994 | Landau et al. |
| 5,363,031 A | 11/1994 | Miller et al. |
| 5,371,453 A | 12/1994 | Fernandez |
| 5,381,096 A | 1/1995 | Hirzel |
| 5,399,446 A | 3/1995 | Takahashi |
| 5,411,816 A | 5/1995 | Patino |
| 5,420,493 A | 5/1995 | Hargadon et al. |
| 5,432,429 A | 7/1995 | Armstrong, II et al. |
| 5,434,495 A | 7/1995 | Toko |
| 5,440,221 A | 8/1995 | Landau et al. |
| 5,454,710 A | 10/1995 | Landau et al. |
| 5,455,499 A | 10/1995 | Uskali et al. |
| 5,460,901 A | 10/1995 | Syrjälä1 |
| 5,463,305 A * | 10/1995 | Koenck ................ 320/145 |
| 5,481,730 A | 1/1996 | Brown et al. |
| 5,485,073 A | 1/1996 | Kasashima et al. |
| 5,488,284 A | 1/1996 | Dias et al. |
| 5,495,503 A | 2/1996 | King et al. |
| 5,510,690 A | 4/1996 | Tanaka et al. |
| 5,534,765 A * | 7/1996 | Kreisinger et al. |
| 5,541,489 A | 7/1996 | Dunstan |
| 5,572,110 A | 11/1996 | Dunstan |
| 5,590,058 A | 12/1996 | Foreman et al. |

| | | | | | | |
|---|---|---|---|---|---|---|
| 5,600,230 A | 2/1997 | Dunstan | 5,864,222 A | | 1/1999 | Takimoto et al. |
| 5,600,247 A | 2/1997 | Matthews | 5,867,006 A | * | 2/1999 | Dias et al. |
| 5,627,449 A | 5/1997 | Fujiki | | | | |
| 5,767,659 A | 6/1998 | Farley | * cited by examiner | | | |

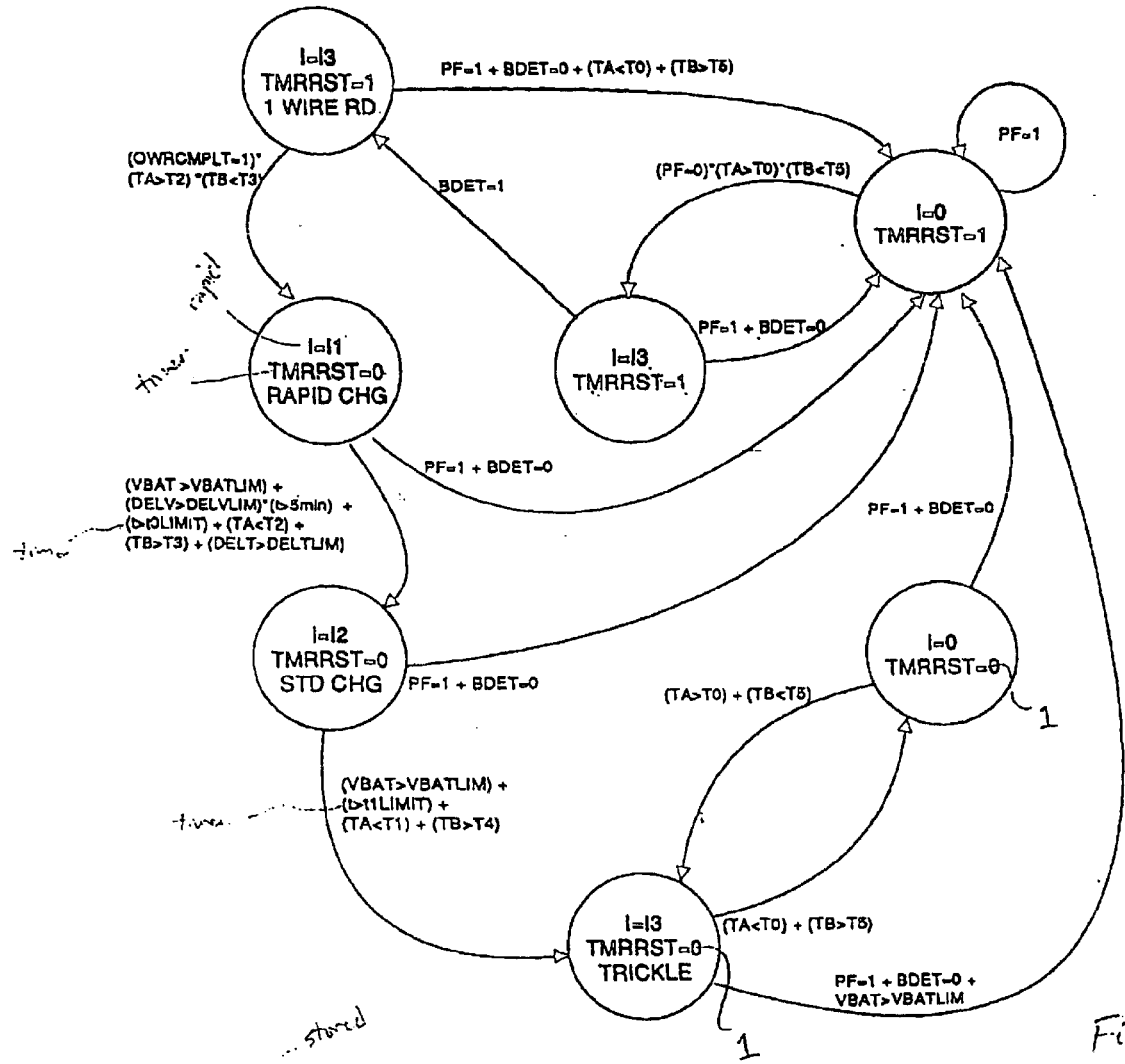

Fig. 3

Parameters
VBAT = Battery Voltage
DELV = Peak VBAT - Current VBAT
t = Elapsed Time
TA = Ambient Temperature
TB = Battery Temperature
DELT = TB - TA
PF = Power Fail
BDET = Battery Presence Detect
I = Battery Charge Current Values
T0 = Lower temperature limit for trickle charge
T1 = Lower temperaure limit for standard charge
T2 = Lower temperature limit for rapid charge
T3 = Upper temperature limit for rapid charge
T4 = Upper temperature limit for standard charge
T5 = Upper temperature limit for trickle charge
DELTLIM = Maximum DELT
VBATLIM = Maximum battery Voltage during charge
DELVLIM = Maximum DELV
t0LIM = Maximum time for rapid charge
t1LIM = Maximum time for standard charge
I1 = Rapid charge battery current
I2 = Standard charge current level
I3 = Trickle charge current level

METHOD OF CONTROLLING THE CHARGING OF A BATTERY

CROSS-REFERENCE TO RELATED APPLICATIONS

This application is a continuation of application Ser. No. 09/973,155, filed Oct. 9, 2001 which is a continuation of application Ser. No. 09/454,275, filed on Dec. 3, 1999 now abandoned which is a continuation of application Ser. No. 09/178,675, filed on Oct. 26, 1998, now U.S. Pat. No. 6,018,228 which is a continuation of application Ser. No. 08/901,068, filed on Jul. 28, 1997, now U.S. Pat. No. 5,867,006 which is a continuation of application Ser. No. 08/764,285, filed Dec. 12, 1996, now U.S. Pat. No. 5,694,024 which is a continuation of application Ser. No. 07/957,571, filed on Oct. 7, 1992, now U.S. Pat. No. 5,592,069.

U.S. patent application Ser. No. 07/953,906, filed Sep. 30, 1992, discloses related subject matter and is hereby incorporated by reference. This cross-referenced application is assigned to the assignee of the present application.

PARTIAL WAIVER OF COPYRIGHT PURSUANT TO 1077 O.G. 22 (Mar. 20, 1987)

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

BACKGROUND AND SUMMARY OF THE INVENTIONS

The present invention relates to electronic devices, and, more particularly, to devices useful for battery charging.

Battery Chargers

The widespread use of battery-powered portable computers (e.g., notebooks, laptops and palmtops) with high performance relies on efficient battery utilization. In particular, portable computers typically use rechargeable batteries (e.g., lithium, nickel-cadmium, or nickel metal hydride) which weight just a few pounds and deliver 4 to 12 volts. Such batteries provide roughly three hours of computing time, but require about three times as long to be recharged. Such slow recharging is a problem and typically demands that users have several batteries with some recharging while others are being used.

Known battery chargers apply a constant voltage across a discharged battery with the applied voltage determined by the maximum voltage acceptable by the battery. FIG. 1a heuristically illustrates such a battery charger with $V_{MAX}$ the maximum voltage acceptable by the battery and $I_{MAX}$ the maximum current; the resistor R and $V_{MAX}$ are the adjustable values. FIG. 1b is the load line for the battery charger of FIG. 1a and shows the charaging current I as a function of the battery voltage V. As the load line shows, the charging current begins at $I_{MAX}$ with a totally discharged battery as indicated by point A. The battery rapidly charges and its voltage increases and the charging current decreases with the operating point moving down the load line as shown by arrow B. Then as the battery voltage rises to near $V_{MAX}$, the charging current falls to zero as indicated by point C. And the small charging current implies a large charging time. Indeed, most of the charging time will be during operation approaching point C.

Furthermore, the different chemistries of various battery types preferably use differing recharging voltages, and varying battery capacities (sizes) demand differing charging currents. However, known battery chargers cannot automatically adapt to such a variety charging conditions and remain simple to use.

Features

The present invention provides battery charging with charging parameter values selected by communication with imbedded information in a battery pack and then adjusted during charging. This permits adaptation to various battery chemistries and capacities, and, in particular, allows for approximately constant current charging at various current levels and for trickle charging.

BRIEF DESCRIPTION OF THE DRAWINGS

The present invention will be described with reference to the accompanying drawings, which are schematic for clarity.

FIG. 3 is a state diagram for the first preferred embodiment;

DESCRIPTION OF THE PREFERRED EMBODIMENTS

Functional Overview

Figure 1A:
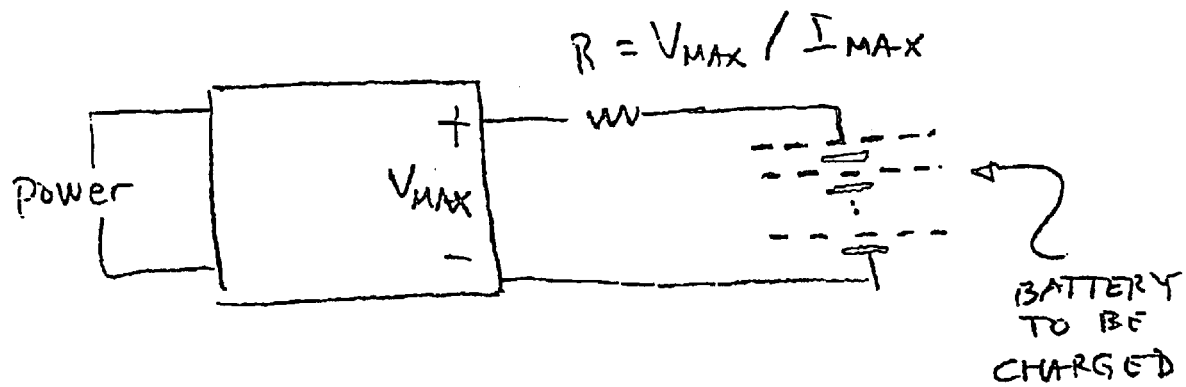
FIGS. 1a–b illustrate known battery chargers and their load lines.
Figure 1B:
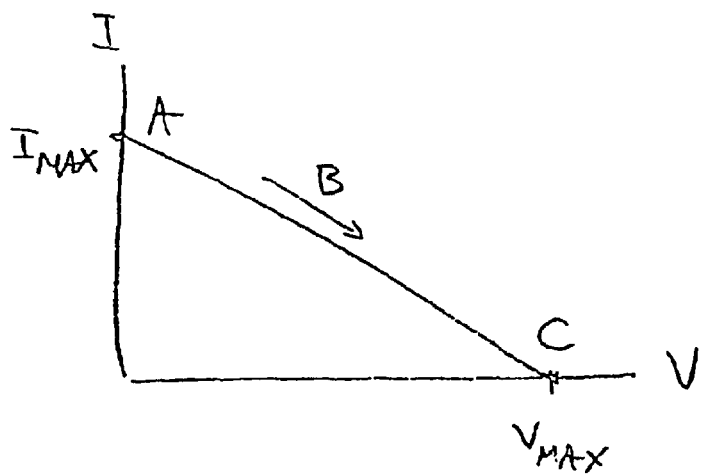
Figure 2:
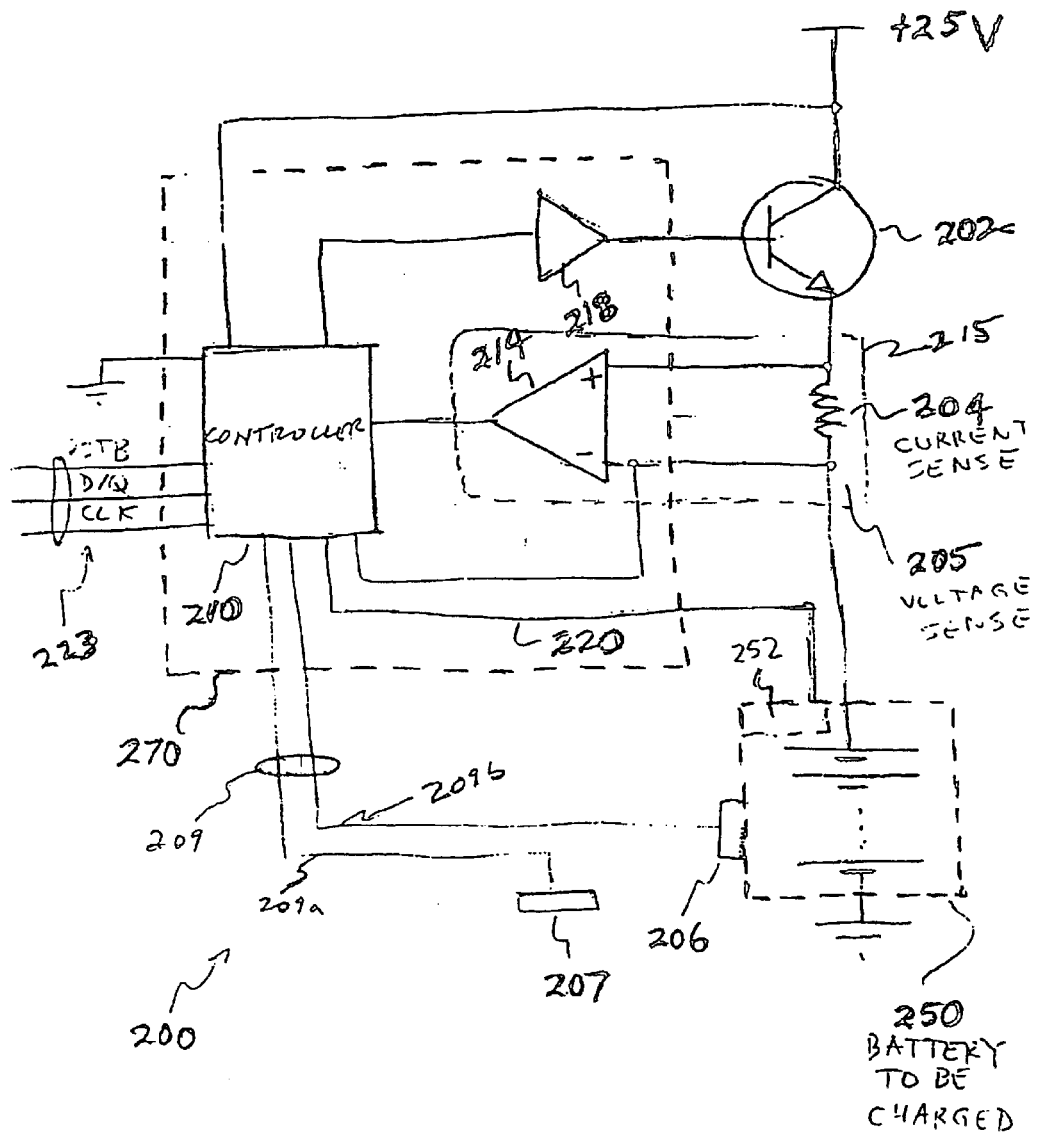
FIG. 2 is schematic functional block diagram of a first preferred embodiment battery charger.

FIG. 2 is a schematic functional block diagram of a first preferred embodiment battery charger, denoted generally by reference numeral 200, connected to charge battery pack 250 with imbedded one-wire communication module 252. Battery charger 200 includes power transistor 202, current sense resistor 204, voltage sense node 205, temperature sensor 206 affixed to battery pack 250, ambient temperature sensor 207, controller 210, operational amplifier 214, power transistor driver 218, one-wire bus 220, and three-wire bus 223. Portion 270 of battery charger 200 may be formed as a single integrated circuit and provide low cost and ruggedness.

Battery charger 200 can provide battery charging up to about 20 volts with 2.5 amp currents; this demands a separate power transistor 202 for cooling. (More generally, power transistor 202 could be replaced by a DC-to-DC converter.) Battery pack 250 may have various numbers of cells and cells of various chemistries which require various charging programs. Controller 210 acquires information about battery pack 250 through inquiry over the one-wire communication bus 220. In particular, module 252 within battery pack 250 contains identification plus charging parameter values, such as maximum voltage $V_{MAX}$ and maximum current $I_{MAX}$ along with charge time and endpoint detection method. Controller 210 reads the identification and charging parameter values and configures itself accordingly. Note that the identification can be used for access control: charger 200 can refuse to charge a battery pack with an invalid identification. Controller 210 also has stored (in nonvolatile ROM) default charging parameter values. Thus when controller 210 is unable to read charging parameter values from battery pack 250, it may read from its own ROM for default parameter values. After acquisition of parameter values, charger 200 begins charging battery pack 250. Charger 200 may also communicate at high speed over its three-wire bus 223 with a computer or other controller; this permits external analysis of the identification and charging parameter values read from module 252 plus external control of access and the charging parameter values.

Operation

FIG. 3 is a state diagram for charger 200 which describes its operation and the charging parameters used. Charger 200 begins in the upper righthand circle of FIG. 3 which represents the state of no power supply (PF=1). No power implies no charging current (I=0) because power transistor 202 cannot be turned on. Also, the charging timer within controller 210 will not be running (TMRRST=1). Controller 210 has an internal voltage regulator, so a 25 volt power supply may be used as illustrated to provide charging of multicell battery packs.

When power is supplied to charger 200 (PF=0), it first checks the inputs of temperature sensors 206 and 207; and if the battery temperature (TB) is less than the upper temperature limit for trickle charge (T5) and if the ambient temperature (TA) is greater than the lower temperature for trickle charge (T0), charger 200 moves to an initial trickle charge state of applying a trickle charge current (I3). The circle in the center of FIG. 3 represents this initial trickle charge state (I=I3). The trickle charge current level is maintained by feedback from amplifier 214 measuring the charging current and then driving power transistor 202. This initial trickle charge state does not have the charging timer running (TMRRST=1) but does immediately detect the presence or absence of a battery pack 250 by detecting a positive or zero voltage at the voltage sense node 205. If no battery pack 250 is connected (BDET=0) or if a power failure occurs (PF=1), then charger 200 reverts back to the no power state. Contrarily, if charger 200 detects the presence of a connected battery pack, then charger 200 moves to the one-wire communication state represented by the circle in the upper lefthand corner of FIG. 3. That is, the initial trickle charge state is just a transient state.

In the one-wire communication state charger 200 maintains the trickle charge current to the connected battery pack 250 (I=I3) and the charging timer remains off (TMRRST=1). Further, charger 200 sends a reset signal over the one-wire communication bus 220 to initiate a read (1 WIRE RD) of the identification and charging parameter values in module 252 of battery pack 250. Charger 200 either reads a recognizable identification to permit charging or not. When an acceptable identification is read but no charging parameter values, module 252 reads from its ROM default charging parameter values. Controller 210 loads the charging parameter values into registers to configure its various subcircuits for comparisons of measured charging parameters with the loaded values. If at any time during this one-wire communication power fails or battery pack 250 is disconnected or the ambient temperature falls below the trickle charge minimum or the battery temperature rises above the trickle charge maximum, charger 200 reverts to the no power state. Otherwise, after completing the one-wire communication (OWRCMPLT=1), charger 200 again checks the ambient and battery temperatures from sensors 206 and 207 and if the battery temperature is less than the upper temperature for rapid charge (T3) and if the ambient temperature is greater than the lower temperature for rapid charge (T2), then charger 200 switches to a state of rapid charge represented by the circle in the lefthand center of FIG. 3. However, if the temperatures do not satisfy the inequalities, charger 200 stays in the one-wire communication state and provides a trickle charge I3 to battery pack 250 until either a temperature changes, battery pack 250 is disconnected, or power failure occurs. Note that the rapid charge current level and temperature limits may be parameter values read from module 252.

In the rapid charge state controller 210 drives the charging current up to I1 and starts the charging timer (I=I1 and TMRRST=0). If there is a power failure or battery pack 250 is disconnected, then charger 200 again reverts to the no power state; otherwise, the rapid charge state persists and charger 200 supplies a charging current I1 to battery pack 250 until one of the following occurs: (1) the battery voltage parameter (VBAT) measured at node 205 exceeds the parameter value (VBATLIM) read from module 252, (2) the parameter battery voltage delta (peak battery voltage sensed at node 205 so far during the charging minus the battery voltage now sensed)(DELV) exceeds the parameter value (DELVLIM) read from module 252 and the charging timer has been running for more than 5 minutes, (3) the charging timer has been running longer than the time for rapid charge parameter value (t0LIM) read from module 252, (4) the ambient temperature is below parameter value T2, (5) the battery temperature is above parameter value T3, or (6) the battery temperature delta (equal to TB—TA)(DELT) exceeds the parameter value (DELTLIM) read from module 252. When one of these six events occurs, charger 200 moves to the standard charge state represented by the circle in the lower lefthand portion of FIG. 3. Note that the rapid charge termination events of significance depend upon battery cell chemistry; for example, nickel-cadmium cells have a voltage drop near maximum charge. This makes a positive battery voltage delta DELV a good indicator of full charge, with the size of a significant DELV varying with the number of cells in series in battery pack 250. Similarly, nickel-cadmium cells charge by an endothermic reaction and thus the battery temperature will not rise until full charge; this makes the battery temperature delta DELT another good indicator of full charge. Again, these parameter values such as DELTLIM, t0LIMIT, T2 may have been read from module 252 or could have been acquired over three-wire communication in the case of no module 252.

In the standard charge state controller 210 drives the charging current to I2 and restarts the charging timer (I=I2 and TMRRST=0). If there is a power failure or battery pack 250 is disconnected, then charger 200 again reverts to the no power state; otherwise the standard charge state persists and charger 200 supplies a charging current I2 to battery pack 250 until one of the following events occurs: (1) the battery voltage (VBAT) sensed at node 205 exceeds the maximum battery voltage during charge (VBATLIM), (2) the charging timer has been running longer than the maximum time for standard charge (t1LIM), (3) the ambient temperature is below the lower temperature limit for standard charge (T1), or (4) the battery temperature is above the upper temperature limit for standard charge (T4). When one of these four events occurs, charger 200 moves to the trickle charge state represented by the circle in the lower center of FIG. 3.

In the trickle charge state controller 210 drives the charging current back to I3 that stops the charging timer (I=I3 and TMRRST=1). If there is a power failure or battery pack 250 is disconnected or the battery voltage VBAT exceeds the maximum VBATLIM then charger 200 once again reverts to the no power state; otherwise, the trickle charge state persists and charger 200 supplies a charging current I3 to battery pack 250 until either (1) the ambient temperature is below T0 or (2) the battery temperature is above T5. When one of these two events occurs, charger 200 moves to the standby state represented by the circle in the lower righthand portion of FIG. 3.

In the standby state controller 210 turns off power transistor 202 and stops the charging timer (I=I3 and TMRRST=1). If there is a power failure or battery pack 250 is disconnected, then charger 200 once again reverts to the no power state; otherwise, the stadby state persists with charger 200 not supply any charging current I3 to battery pack 250 until either (1) the ambient temperature is rises above T0 or (2) the battery temperature falls below T5. When one of these two events occurs, charger 200 returns to the trickle charge state from whence it came and repeats itself.

One-wire Communication

Figure 4:
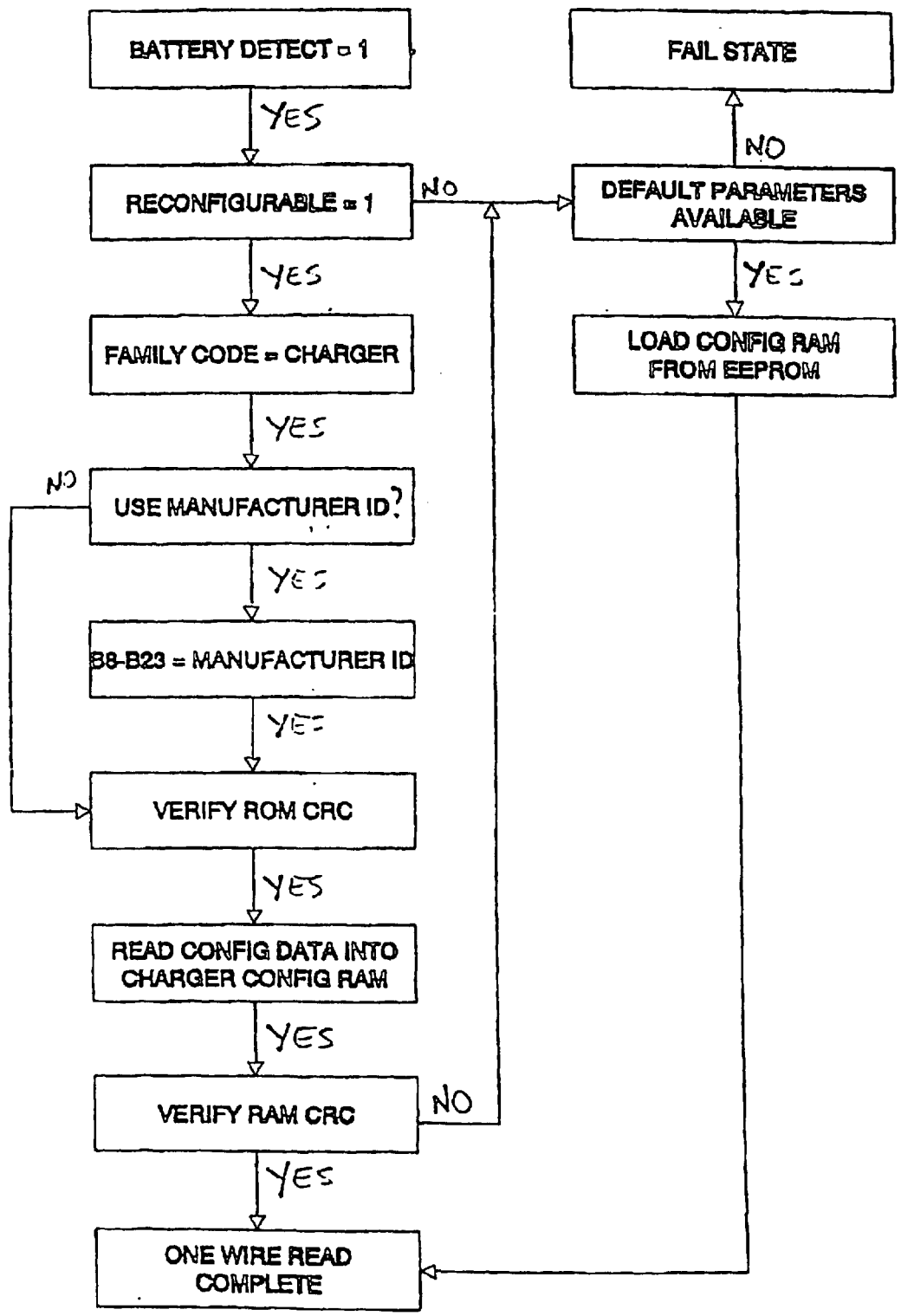
FIG. 4 is a flow chart for communication by the first preferred embodiment.
Figure 5:
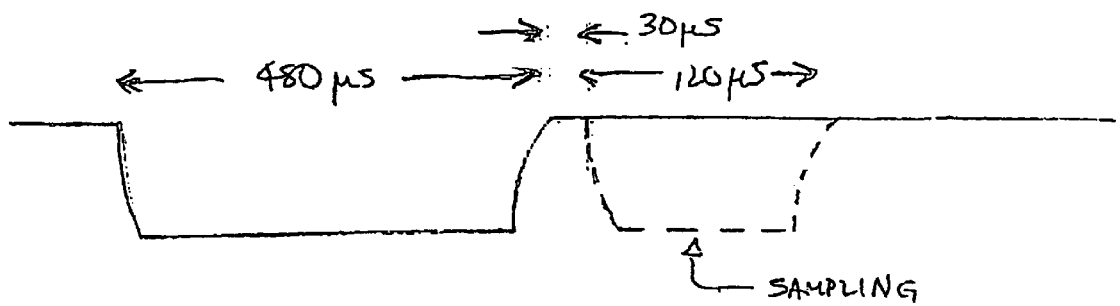
FIGS. 5–7 show communication waveforms.
Figure 6:
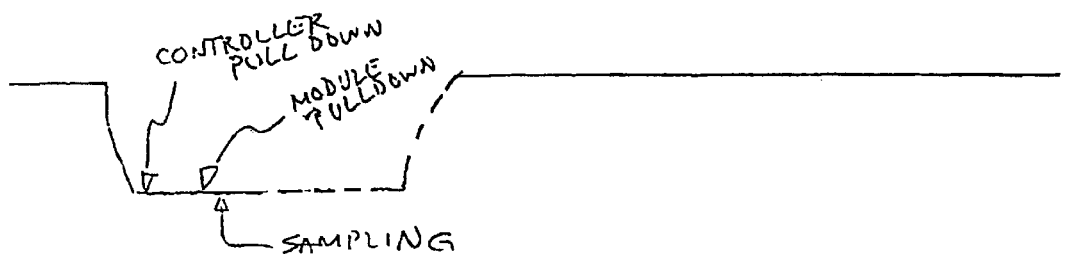
Figure 7:

FIG. 4 is a flow chart of the communication by charger 200 with battery pack module 252, and FIGS. 5–7 illustrate signalling—waveforms during one-wire communication. Controller 210 pulls the data line of communication bus 220 high (+5 volts) and this supplies the power to module 252 which includes an energy storage capacitor. The transient initial trickle charge state of charger 200 provides time for module 252 to store sufficient energy in its storage capacitor to power up its circuitry. Module 252 only responds to signals from controller 210, and thus only requires power when communicating. Thus module 252 can communicate with controller 210 even when battery pack 250 is fully discharged.

The flow shown of FIG. 4 begins with Battery Detect=1 which is the detection of battery pack 250 connected to node 205; this corresponds to the movement from the initial trickle charge state to the communication state in FIG. 3. Controller 210 detects battery pack 250 by noting a positive voltage at node 205 which derives from residual charge of battery pack 250 and initial charging by trickle charge being applied in the initial trickle charge state.

Once battery pack 250 has been detected, controller 210 applies a reset signal on the data line of one-wire bus 220 by driving the data line low (ground) for about 480 microseconds ($\mu$s) and then pulling the data line high (+5 volts) for about 480 $\mu$s. In response to the 480 $\mu$s low reset signal, module 252 signals its presence with a presence detect signal by pulling the data line low during the 480 $\mu$s high. The pulldown in module 252 overpowers the pullup of controller 210, so the data line goes low and controller 210 senses the low. Module 252 generates a nominal 120 $\mu$s time period for the pulldown presence detect pulse and applies this pulldown beginning a nominal 30 $\mu$s after controller 210 has returned the data line high. Howver, this time period may vary by a factor of 2 amongst modules, so controller 210 samples the data line at 65–70 $\mu$s after it has returned the data line high. See FIG. 5 which shows the waveforms on the data line. Controller 210 may repeatedly apply reset signals on the data line in order to account for the delay in the connection of one-wire bus 220 to battery pack 250 after the connection to node 205.

If the sampling of the data line by controller 210 does not reveal a presence detect signal (Reconfigurable=1 not true in FIG. 4), then controller 210 will use its default charging parameter values by reading them from its memory (Default Parameters Available and Load Configur RAM From EEPROM in FIG. 4). Conversely, if controller 210 senses the data line low (Reconfigurable=1), then it continues with one-wire communication and drives the data line low for 1+$\mu$s and then pulls the data line high again to allow the response of module 252 to control the data line. Module 252 responds to the high-to-low transition by reading the first bit in its memory onto the data line: when the first bit is a 0, then module 252 pulls down the data line for a nominal 30 $\mu$s so in effect the data line remains low and controller 210 detects this by sampling after 15 $\mu$s. FIG. 6 shows the read 0 waveforms on the data line. Contrarily, when the first bit is a 1, then module 252 lets controller 210 pull up the data line; see FIG. 7. This process of a high-to-low by controller 210 followed by a pulldown or no pulldown response of module 252 proceeds through the memory of module 252 until all 320 bits (64 identification bits plus 256 charging parameter value bits) have been read. The total read time thus may be less than 50 milliseconds.

Figure 8:
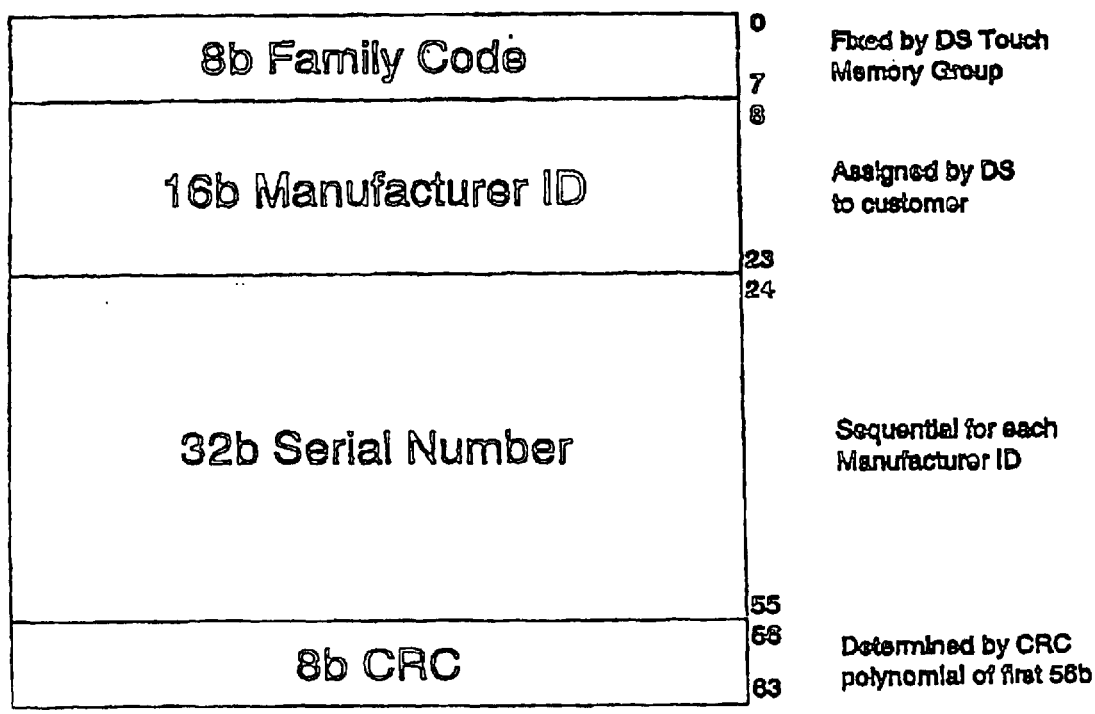
FIG. 8 illustrates identification memory organization.

Module 252 has two memories: a 64-bit ROM for identification and a 256-bit EEPROM for charging parameter values. FIG. 8 illustrates the content of the 64 bits of ROM. In particular, the first eight bits indicate the family of modules to which module 252 belongs (Family Code=Charger in FIG. 4). If this family is for a battery pack with a manufacturer's identification (Use Manufacturer ID in FIG. 4), then the next sixteen bits read (B8–B23=Manufacturer ID) may be decoded to check identification of the manufacturer of battery pack 252 and perhaps prevent charging by charger 200. Lastly, after 64 bits have been read from the ROM, controller 210 applies a Cyclic Redundancy Check (CRC) algorithm to the first 56 bits to compare to the last eight bits to verify that the communication was error free (Verify ROM CRC).

After reading the ROM of module 252, controller 210 then reads the 256 bits of EEPROM to get charging parameter values for operation (Read Config Data Into Charger Config RAM). The reading of the parameter values is also checked by a CRC byte (Verify RAM CRC). Once the EEPROM has been read, the one-wire communication is complete (One Wire Read Complete in FIG. 4 and OWRDMPLT=1 in FIG. 3). Charger 200 then switches into the rapid charge state using the charging parameter values read from module 252.

U.S. Pat. No. 5,045,675 contains a discussion of one-wire communication and serial memory reading and is hereby incorporated by reference.

Further Modifications and Variations

The preferred embodiments may be modified in many ways while retaining one of more of the features of a battery charger with charging parameter values selected by communication with a battery pack to be charged and using multiple constant charging currents with multiple endpoint determinants. For example, the memory in the battery pack could be all ROM or all EEPROM, or EPROM, a mixture of two memory types; the communication could be over full duplex or other than one-wire, and the memory may have its own power supply to be operative with a discharged battery pack; sensors for endpoint determinants other than temperature increment and voltage increment may be used; the power transistor could be a switching AC-DC converter or a switching DC-DC converter; the controller may have nonvolatile memory or just registers for holding charging parameter values; and so forth.

What is claimed is:

1. A method of charging a battery pack comprising:

reading from a digital memory identification data stored in said digital memory wherein said digital memory is a part of said battery pack;

determining if said read battery pack identification data represents a valid identification;

reading charging parameter values from said digital memory;

altering the charging algorithm at least in part based upon said read charging parameters.

2. A method of charging a battery pack device comprising:

reading digital data from a memory device, said memory device being substantially part of said battery pack device;

determining a battery ID from said digital data;

determining a battery charging parameter from said digital data; and charging said battery pack device according to said charging parameter.

3. The method of charging said battery pack device of claim 2, wherein said battery charging parameter comprising a plurality of parameters.

4. The method of charging said battery pack device of claim 2, wherein said battery charging parameter comprises at least one of a maximum voltage parameter, a maximum current parameter, a charge time parameter, and an end of charging detection method.

5. A method of recharging a the power pack of an electronic device comprising:

coupling said power pack to a recharging circuit;

reading, from said power pack, a digital identification;

reading, from said power pack, charging parameter values; and altering a charging algorithm, at least in part, based upon said read power pack charging parameters.

6. A rechargeable battery pack device comprising:

at least one rechargeable battery device;

a module comprising digital memory, said digital memory comprising a battery pack ID, and charging parameter values; and connections for said rechargeable battery device and said module to connect to another device.

* * * * *